United States Patent
Richard

(10) Patent No.: US 12,478,458 B2
(45) Date of Patent: Nov. 25, 2025

(54) SELF-TAPPING DENTAL IMPLANT

(71) Applicant: ANTHOGYR, Sallanches (FR)

(72) Inventor: Hervé Richard, Notre Dame de Bellecombe (FR)

(73) Assignee: ANTHOGYR, Sallanches (FR)

( * ) Notice: Subject to any disclaimer, the term of this patent is extended or adjusted under 35 U.S.C. 154(b) by 477 days.

(21) Appl. No.: 17/610,233

(22) PCT Filed: Jul. 4, 2020

(86) PCT No.: PCT/IB2020/056310
§ 371 (c)(1),
(2) Date: Nov. 10, 2021

(87) PCT Pub. No.: WO2021/005481
PCT Pub. Date: Jan. 14, 2021

(65) Prior Publication Data
US 2022/0249207 A1  Aug. 11, 2022

(30) Foreign Application Priority Data
Jul. 8, 2019 (EP) .................................. 19185034.6

(51) Int. Cl.
*A61C 8/00* (2006.01)

(52) U.S. Cl.
CPC .......... *A61C 8/0025* (2013.01); *A61C 8/0024* (2013.01)

(58) Field of Classification Search
CPC .............................. A61C 8/0025; A61C 8/0024
See application file for complete search history.

(56) References Cited

U.S. PATENT DOCUMENTS

2007/0099153 A1  5/2007  Fromovich
2009/0325126 A1  12/2009  Fromovich
(Continued)

FOREIGN PATENT DOCUMENTS

EP  1093766 A1  4/2001
EP  1186275 A1  3/2002
(Continued)

OTHER PUBLICATIONS

Self-Tapping Screws (an online specification obtained from a store specialized in fasteners) [online]. [retrieved Feb. 8, 2024]. Retrieved from the Internet: https://web.archive.org/web/20120516112111/https://www.mutualscrew.com/media/refguides/sthilo.pdf (Year: 2012).*

(Continued)

Primary Examiner — Eric J Rosen
Assistant Examiner — Luis Ruiz Martin
(74) Attorney, Agent, or Firm — William H. Eilberg

(57) ABSTRACT

A dental implant includes an implant body extending along a longitudinal axis between a crown end and an apical end, the implant body having a core along which a helical thread extends with at least one thread, the core being tapered towards the apical end on at least one section of the length of the dental implant. At least two tapping grooves are arranged in the thread. The grooves interrupt the thread, so that the thread includes a series of consecutive thread arcs. Each thread arc has an apical surface oriented towards the apical end of the dental implant, and a crown surface oriented towards the crown end of the dental implant. A peripheral lateral surface connects the apical surface and the crown surface of the thread arc. In at least one section of the dental implant in which the core is tapered, at least one thread arc has a radial offset.

30 Claims, 7 Drawing Sheets

(56) References Cited

U.S. PATENT DOCUMENTS

| | | | |
|---|---|---|---|
| 2010/0112523 A1 | 5/2010 | Fromovich | |
| 2012/0295225 A1 | 11/2012 | Fromovich | |
| 2013/0089834 A1 | 4/2013 | Fromovich | |
| 2014/0045144 A1* | 2/2014 | Dukhan | A61C 8/0025 433/174 |
| 2016/0081771 A1 | 3/2016 | Fromovich | |
| 2017/0007375 A9 | 1/2017 | Fromovich | |
| 2019/0105131 A1* | 4/2019 | Barton | A61C 8/0025 |
| 2020/0360116 A1* | 11/2020 | Thomé | A61C 8/0025 |

FOREIGN PATENT DOCUMENTS

| | | | | |
|---|---|---|---|---|
| EP | 3453358 A1 * | 3/2019 | | A61C 8/0022 |
| FR | 2972343 A1 | 9/2012 | | |
| FR | 2975891 A1 | 12/2012 | | |
| KR | 101090618 B1 * | 11/2011 | | |
| WO | WO-2019014736 A1 * | 1/2019 | | A61C 8/00 |

OTHER PUBLICATIONS https://www.mutualscrew.com/department/steel-black-oxide-finish-phillips-flat-head-high-low-screws-14298.cfm (Year: 2011).*

* cited by examiner

SELF-TAPPING DENTAL IMPLANT

TECHNICAL FIELD OF THE INVENTION

The present invention relates to the field of dental implantology, more particularly to a self-tapping dental implant.

When placing an implant in the maxillary or mandibular bone of a patient, it is important to obtain the best possible post-implantation stability (called primary stability) in order to be able to load said implant as quickly as possible, or even immediately, that is to say before the bone has had time to colonize the endosseous surface of the implant.

The primary stability of an implant depends in particular on the density of the bone in which it is implanted.

When the bone is of low density (conventionally of density D3 or D4 according to the Misch classification), a cylindrical hole is made in the maxillary or mandibular bone using a drill, in which hole there is then inserted the end osseous part of a dental implant having a volume greater than the volume of the hole made in the bone. It is possible, for example, to use a known dental implant comprising an implant body extending along a longitudinal axis between a coronal end and an apical end, said implant body having a core along which there extends a helical threading having at least one thread, said core being tapered in the direction of the apical end over at least a segment of the length of the implant. Such a dental implant is described, for example, in the document EP 1,624,826. The dental implant generally has an apical end with a cross section substantially equal to the cross section of the cylindrical hole. During its insertion, the dental implant gradually compresses the bone at the periphery of the hole made in the bone, such that the primary stability is increased.

However, when a dental implant of this kind is inserted into a bone of greater density (conventionally of density D1 or D2 according to the Misch classification), the density of the bone makes the latter less easily compressible, such that the penetration of the dental implant requires a much higher screwing torque, sometimes one that is too high to be supported without damage by the dental implant (in particular at the level of its connections allowing it to be screwed in by rotational driving). It is then generally necessary to use a tap to provide the hole in the bone with an internal threading corresponding substantially to the external threading of the dental implant, prior to the introduction of the dental implant into the hole made in the bone.

However, the use of a tap is time-consuming and delicate. Indeed, whereas the drill previously used for making the cylindrical hole was driven at more than 1000 revolutions per minute, the tap ought only to be driven at a very low speed of rotation (about 50 revolutions per minute). It is therefore important for the practitioner to change the speed of the tool so as not to accidentally pass through the maxillary or mandibular bone with the tap. The tapping step is made time-consuming because of the low rotational drive speed of the tap, and it is further complicated by the latter having to be driven in one direction and then in the other, in such a way as to alternately tap the bone gradually without breaking the tap.

To avoid having to use a tap, it has been proposed to provide the dental implant itself with at least one tapping groove.

However, the insertion torque during screwing remains relatively high, or even too high.

DISCLOSURE OF THE INVENTION

A problem addressed by the present invention is that of making available a dental implant capable of being inserted into low-density bone by compressing the bone to obtain good primary stability, but also capable of being inserted into a bone of greater density without needing to have recourse to a preliminary operation of tapping the hole made in the bone.

To achieve these aims, and others too, the invention proposes a dental implant comprising an implant body extending along a longitudinal axis between a coronal end and an apical end, said implant body having a core, along which there extends a helical threading having at least ore thread, said core being tapered in the direction of the apical end over at least one segment of the length of the dental implant, in which:

at least two tapping grooves are formed in the threading and interrupt said at least one thread, such that said at least one thread has a succession of consecutive thread arcs, a thread arc being separated from a thread arc consecutive to it by one of said at least two tapping grooves, each thread arc has an apical surface oriented toward the apical end of the dental implant and a coronal surface oriented toward the coronal end of the dental implant, each thread arc has a peripheral lateral surface connecting the apical surface and the coronal surface of said thread arc and developing from a leading end to a trailing end;

according to the invention, in said at least one segment of the dental implant in which the core is tapered, at least one thread arc has a radial setback, such that the peripheral lateral surface of said at least one thread arc having a radial setback is at ail points situated at a distance from the longitudinal axis that is less than the maximum distance, from the longitudinal axis, of the peripheral lateral surface of a thread arc which is consecutive to said at least one thread arc having a radial setback.

On account of the radial setback on its peripheral lateral surface, when the dental implant is screwed into the hole made in the bone, the peripheral lateral surface of said thread arc having a radial setback does not rub against the bone substance against which has previously rubbed the peripheral lateral surface of the thread arc which is consecutive to it and which penetrates just before it into the hole. The insertion torque when screwing into the bone is thereby reduced, but without the tapping and screwing functions in the bone being affected.

Of course, this reduction in the insertion torque is strengthened by providing several thread arcs having a radial setback. Said at least one thread can thus advantageously have an alternation of thread arcs having a radial setback and thread arcs that are without a radial setback.

To promote satisfactory orientation of the dental implant during its insertion by screwing into the hole, provision can preferably be made that:

the dental implant comprises a plurality of thread arcs having a radial setback, the thread arcs having a radial setback are distributed in a balanced manner all around the longitudinal axis.

This therefore promotes an orientation of the dental implant with its longitudinal axis substantially coaxial with the axis of elongation of the hole made in the bone.

For simplified manufacture by machining, said at least one thread arc can advantageously have a radial setback such that all the points of its peripheral lateral surface are situated substantially at the same distance from the longitudinal axis.

Good results have been obtained by providing that the setback of said at least one thread arc having a radial setback is advantageously less than or equal to 30% of the maximum height (taken in a plane substantially perpendicular to the longitudinal axis) of the apical surface in the vicinity of the trailing or leading end of a thread arc which is consecutive to said at least one thread arc having a radial setback.

A setback of this kind is a good compromise for limiting the friction at the periphery of the implant on the bone (and therefore for reducing the insertion torque when screwing) while providing satisfactory support of the implant on the bone substance by way of the apical and coronal surfaces of the thread arcs.

Advantageously, provision can be made that:
in a part of the threaded length of the dental implant, the dental implant has an apical segment, developing from the apical end in the direction of the coronal end,
the apical segment is without thread arcs having a radial setback.

An apical segment of this kind provides good contact with the bone at the periphery of the hole (or even good penetration into the latter), so as to obtain a good advance of the dental implant by screwing into the hole.

Preferably, the threading can comprise a plurality of threads, preferably two.

For good balancing of the dental implant, provision can advantageously be made that three tapping grooves are formed in the threading.

Advantageously, said at least two tapping grooves extend over more than half of the threaded length of the dental implant. It is thus possible to provide an alternation of thread arcs having a radial setback and thread arcs without a radial setback over more than half of the dental implant, which permits a reduction in the insertion force, when screwing the implant, over more than half of its screwing course.

Preferably, said at least two tapping grooves may extend helically. Such a shape of the tapping grooves permits a more even distribution of an alternation of thread arcs having a radial setback and thread arcs without a radial setback. The dental implant then benefits from better balancing during its insertion by screwing.

Advantageously, the core can be tapered at a cone angle.

Advantageously, the threading can be tapered over all or part of the length of the dental implant, preferably at a cone angle. Alternatively or in addition, the threading can be cylindrical over all or part of the length of the dental implant.

BRIEF DESCRIPTION OF THE DRAWINGS

Other objects, features and advantages of the present invention will become clear from the following description of particular embodiments, given with reference to the accompanying figures, in which.

DESCRIPTION OF THE PREFERRED EMBODIMENTS

Figure 1:
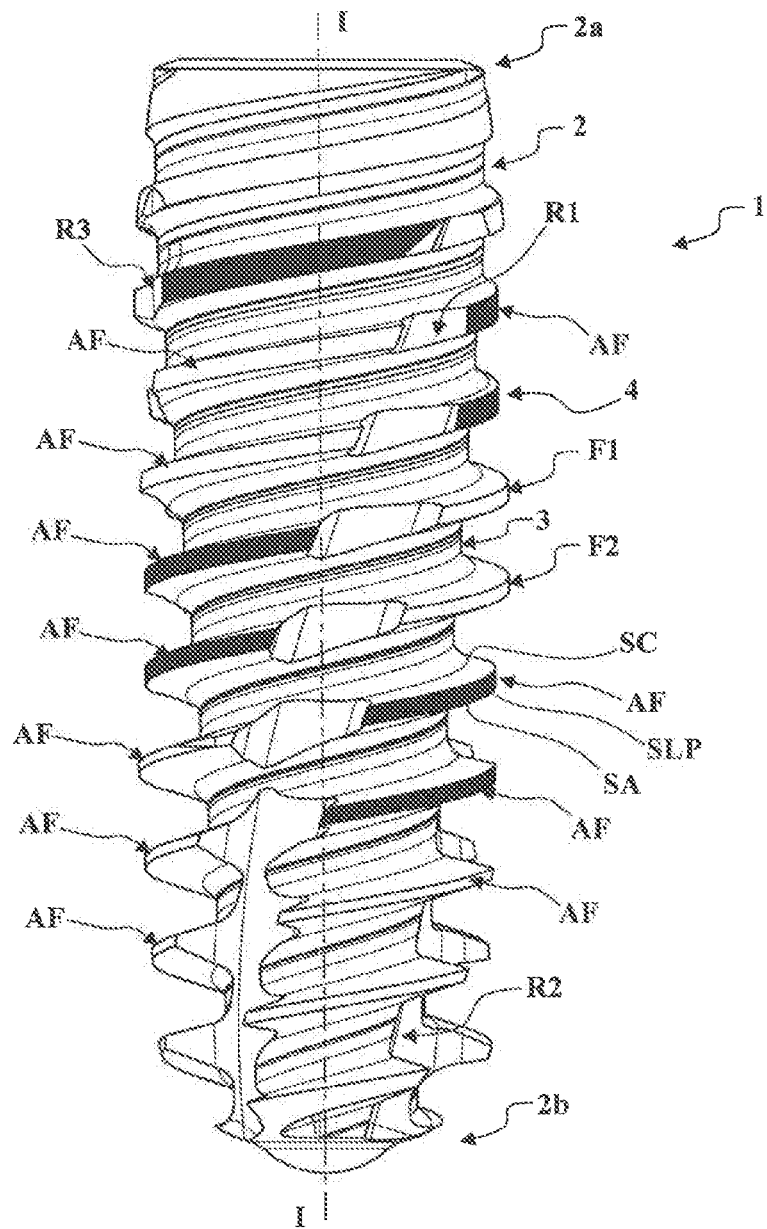
FIG. 1 is a side view of a particular embodiment of a dental implant according to the invention, in a first orientation about the longitudinal axis.

FIGS. 1 to 7 illustrate a particular embodiment of a dental implant 1 according to the invention.

As is illustrated in FIGS. 1 to 5, the dental implant 1 comprises an implant body 2 extending along a longitudinal axis I-I between a coronal end 2a and an apical end 2b. The implant body 2 has a core 3, along which there extends a helical threading 4 with at least one thread. In this case, the threading 4 here comprises two threads F1 and F2.

Figure 5:
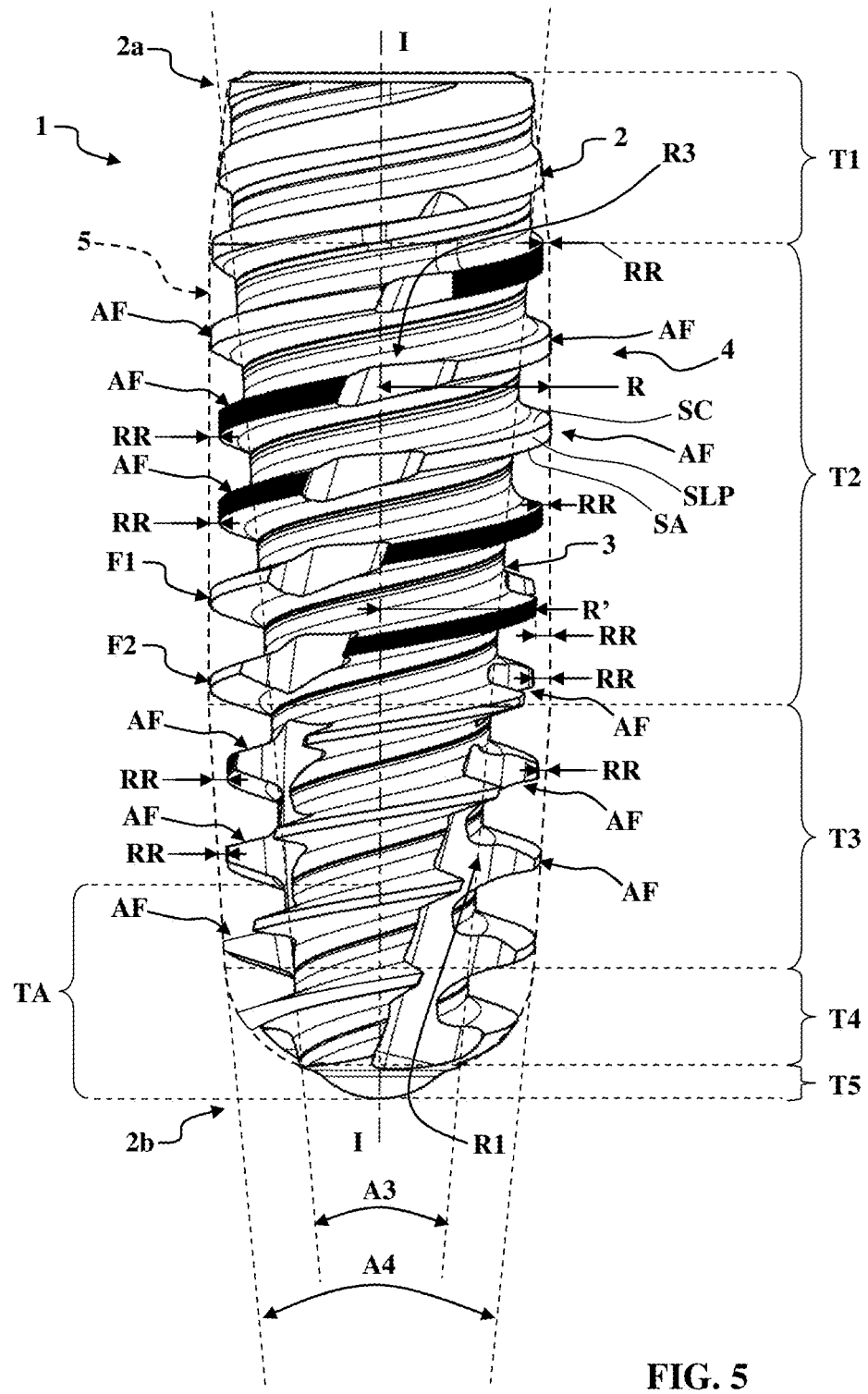
FIG. 5 is the view from FIG. 3, on which broken lines illustrate the outer envelope of the dental implant in the absence of a radial setback on its thread arcs.

In FIG. 5, broken lines have been used, to illustrate the outer envelope 5 of the implant body 2 or envelope of the peripheral lateral surfaces of the threads F1 and F2. The envelope of the core 3 has also been illustrated by means of broken lines. It can thus be seen that the implant body 2 comprises five segments T1 to T5 from its coronal end 2a to its apical end 2b.

In the segment T1, the core 3 is substantially cylindrical, while the threading 4 is conical with a taper oriented toward the coronal end 2a. The height of the threads F1 and F2 (taken in a plane substantially perpendicular to the longitudinal axis 1-1) thus decreases in the direction of the coronal end 2a. The progressive decrease in the cross section of the dental implant 1 in the vicinity of its coronal end 2a makes it possible to take into account the volume of bone which is reduced at the vicinity of the osseous crest of the maxillary or mandibular bone in the vestibular-palatal direction, for esthetic integration of the dental implant 1.

In the segment T2, the core 3 tapers in the direction of the apical end 2b, being conical with a taper oriented toward the apical end 2b, while the threading 4 is substantially cylindrical. The height of the threads F1 and F2 (taken in a plane substantially perpendicular to the longitudinal axis I-I) thus increases in the direction of the apical end 2b.

In the segment T3, the core 3 is also conical. Its taper is the same as in the segment T2. The threading 4 is also tapered in the direction of the apical end 2b, being conical with a taper oriented toward the apical end 2b. The variation in the height of the threading 4 depends on the relationship between the respective cone angles A3 and A4 of the core 3 and of the threading 4:

when the cone angle A3 of the core 3 is greater than the cone angle A4 of the threading 4, the height of the threading 4 increases in the direction of the apical end 2b, when the cone angle A3 of the core 3 is equal to the cone angle A4 of the threading 4, the height of the threading 4 is substantially constant in the direction of the apical end 2b, when the cone angle A3 of the core 3 is less than the cone angle A4 of the threading 4, the height of the threading 4 decreases in the direction of the apical end 2b.

In the particular embodiment illustrated in the figures, the cone angles A3 and A4 are substantially equal.

In the segment T4, the core 3 is still conical and tapers toward the apical end 2b. Its taper is the same as that in the segments T2 and T3. The threading 4 is for its part rounded and has a substantially zero height at the junction of the segments T4 and T5.

The segment T5 is convex, in the form of a half-lens. It is completely optional.

The core 3 is thus tapered in the direction of the apical end 2b over at least one segment of the length of the dental implant 1, in this case over the segments T2 to T4.

Figure 2:
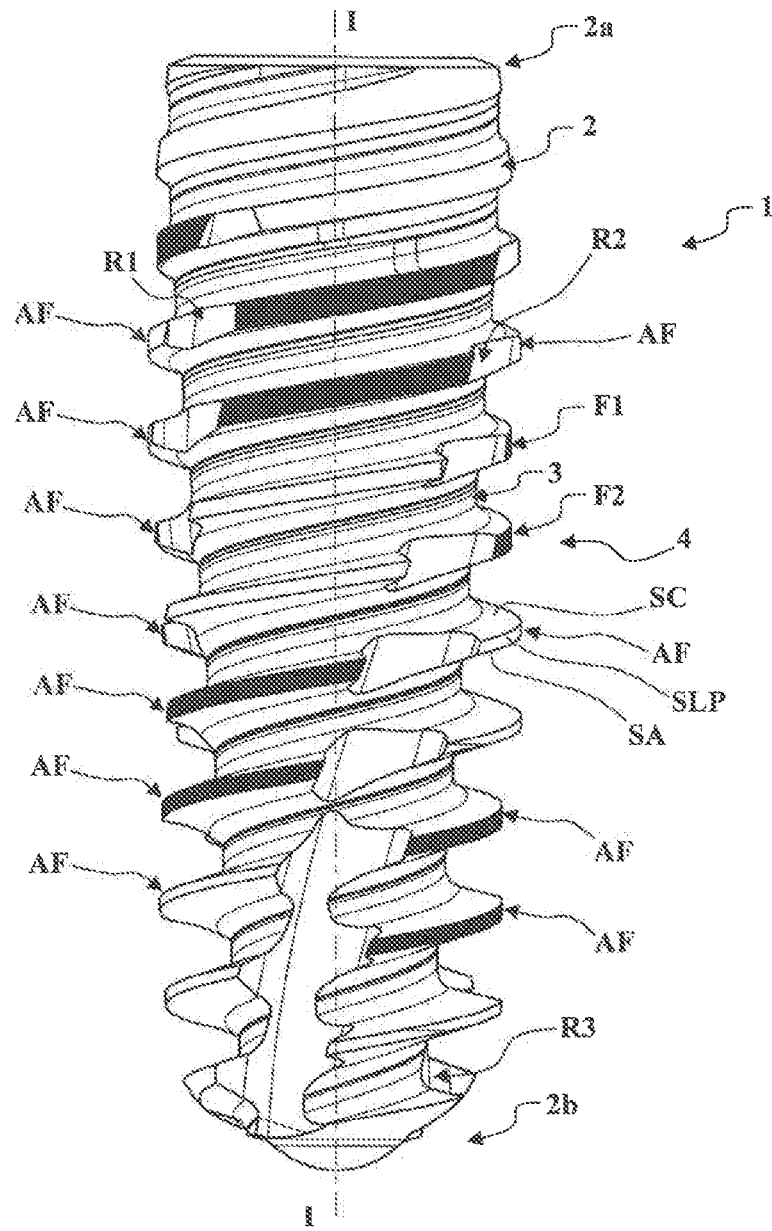
FIG. 2 is a side view of the dental implant from FIG. 1, in a second orientation about the longitudinal axis.
Figure 3:
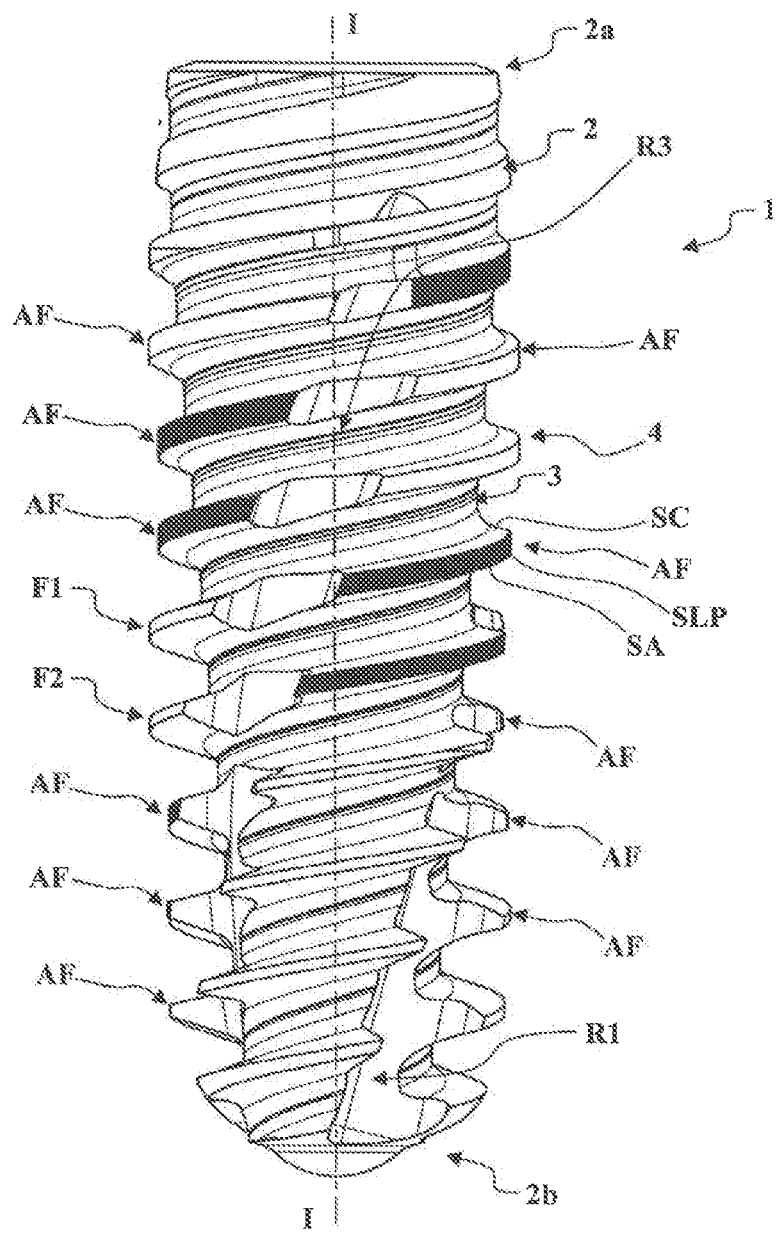
FIG. 3 is a side view of the dental implant from FIG. 1, in a third orientation about the longitudinal axis.
Figure 4:
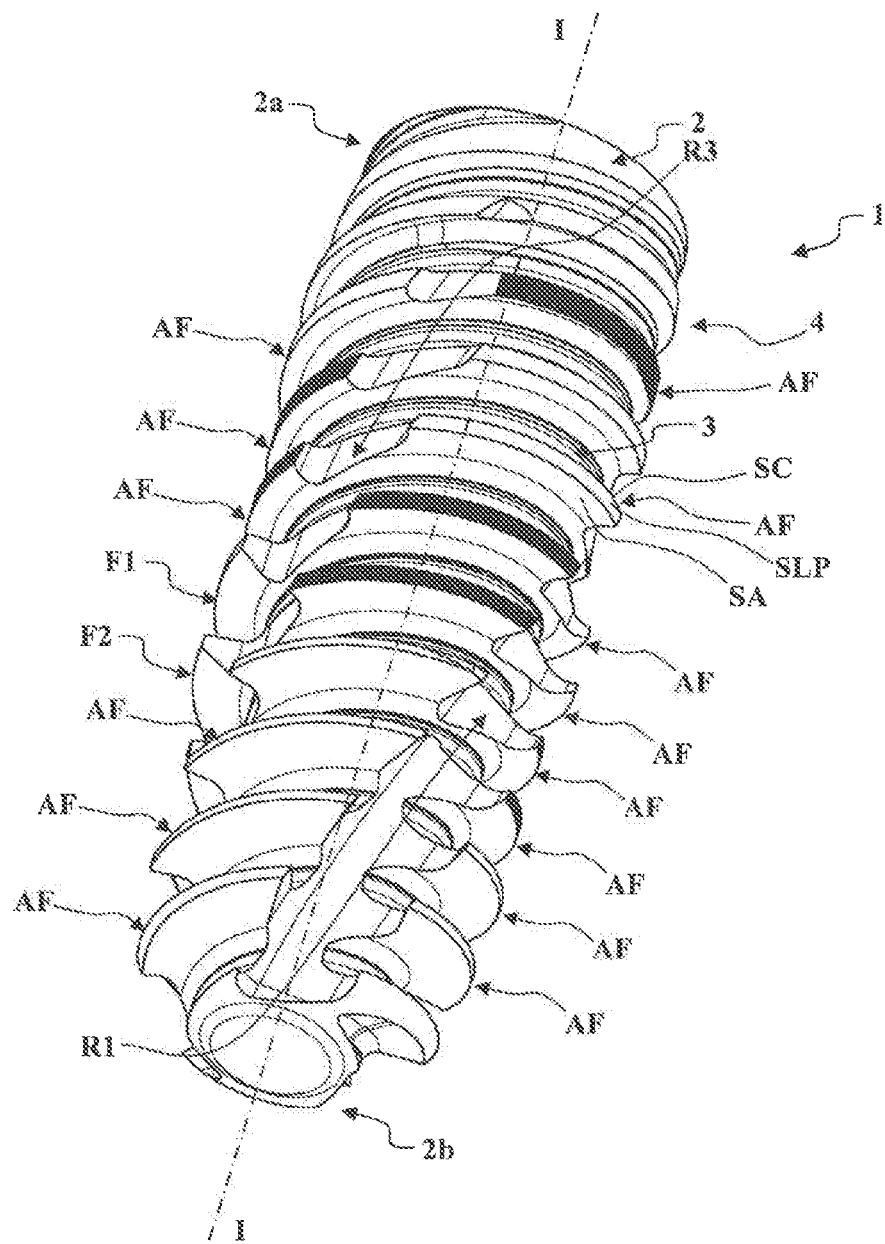
FIG. 4 is a perspective view of the dental implant from FIG. 1.

As will be seen from FIGS. 1 to 3, which show the dental implant 1 in three different orientations, at least two tapping grooves are formed in the threading 4. In this case, there are three tapping grooves R1 to R3 interrupting the threads F1 and F2. The threads F1 and F2 thus respectively have a succession of consecutive thread arcs AF, a thread arc AF being separated from a thread arc AF which is consecutive to it by one of said at least two tapping grooves R1, R2 or R3. In the figures, only some of the thread arcs are indicated by the reference AF, so as not to affect the clarity of the presentation.

The tapping grooves R1 to R3 extend over more than half (in this case about 85%) of the threaded length of the dental implant 1.

The grooves R1 to R3 are not straight, but extend helically along the dental implant 1, about the longitudinal axis I-I.

Figure 6:
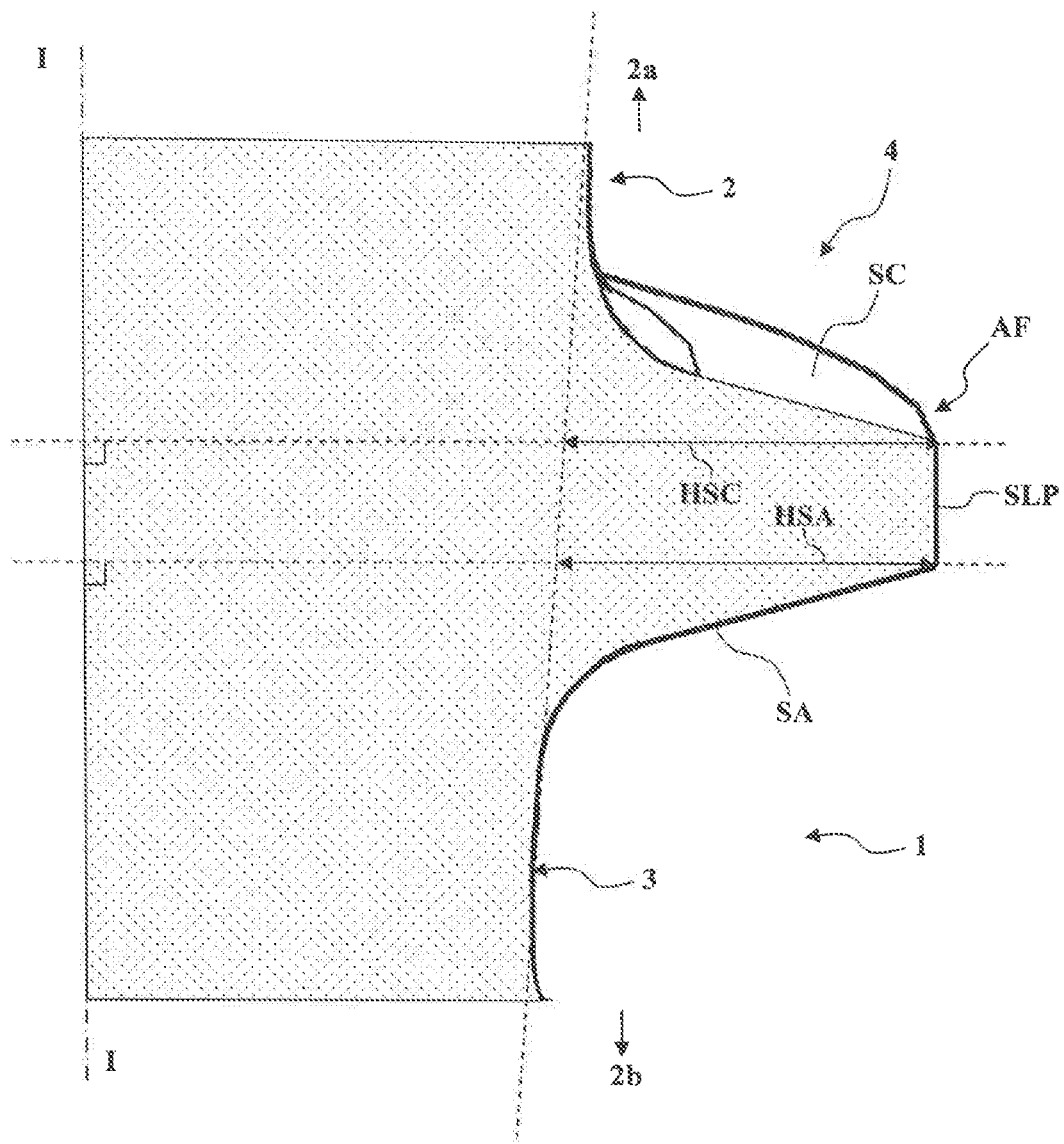
FIG. 6 is a partial longitudinal sectional view of a thread arc of the dental implant from FIG. 1.

As can be seen better in FIG. 6, each thread arc AF has an apical surface SA oriented toward the apical end 2b of the dental implant 1, and having a height HSA (taken in a plane substantially perpendicular to the longitudinal axis I-I). Each thread arc AF also has a coronal surface SC oriented toward the coronal end 2a of the dental implant 1, and having a height HSC (taken in a plane substantially perpendicular to the longitudinal axis I-I). Each thread arc AF has a peripheral lateral surface SLP connecting the apical surface SA and the coronal surface SC of said thread arc AF.

Figure 7:
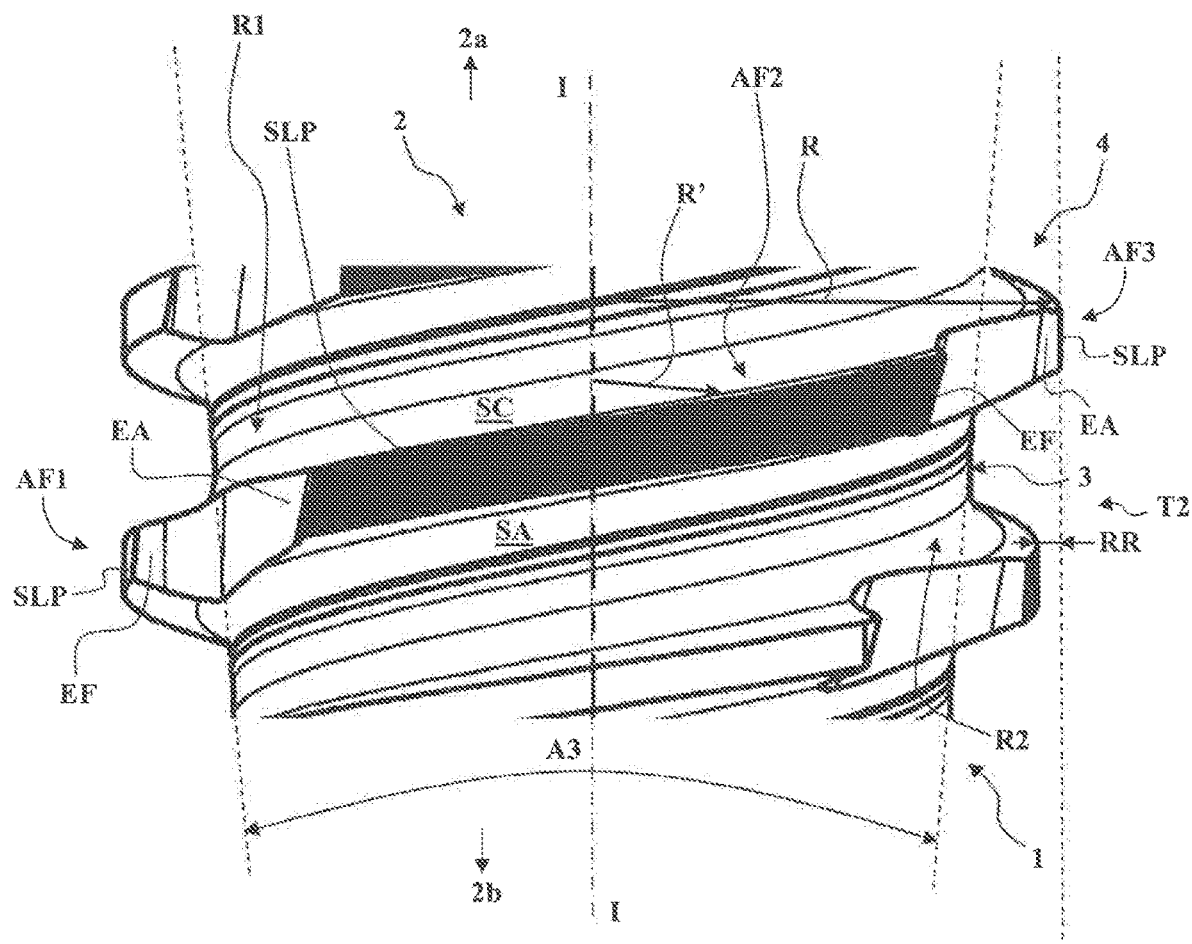
FIG. 7 is a partial side view of the dental implant from FIG. 1.

As can be seen better in FIG. 7, the peripheral lateral surface SLP of a thread arc AF develops helically from a leading end EA to a trailing end EF. The leading end EA is intended to penetrate the bone first during the insertion of the dental implant 1 by screwing into the bone, and is intended to cut into the bone in order to tap it.

In the segments T2 and T3 of the dental implant 1, in which segments the core 3 is tapered, thread arcs AF (of which the peripheral lateral surface SLP is colored black in order to identify them) have a radial setback RR such that the peripheral lateral surfaces SLP (in black) of said thread arcs AF having a radial setback RP are at all points situated at a distance from the longitudinal axis that is less than the maximum distance, from the longitudinal axis I-I, of the peripheral lateral surface SLP of a thread arc AF which is consecutive to a thread arc AF having a radial setback RR.

The radial setbacks RR of some thread arcs are clearly shown in FIG. 5 by means of the outer envelope 5 of the dental implant 1.

This feature is better illustrated in FIG. 7 using three thread arcs AF1, AF2 and AF3 located in the segment T2. The thread arcs AF1 and AF2 are separated from each other by the tapping groove R1, while the tbread arcs AF2 and AF3 are separated from each other by the tapping groove R2. The thread arcs AF1 and AF3 are thus consecutive to the thread arc AF2.

The threading 4 being cylindrical in the segment T2, the peripheral lateral surfaces SLP of the thread arcs AF1 and AF3 are situated at a constant distance from the longitudinal axis I-I equal to the radius R of the cylindrical segment T2. For its part, the thread arc AF2 has a radial setback RR which means that its peripheral lateral surface SLP (shown in black to retake it easier for the reader to understand) is situated at all points at a distance less than the radius R with respect to the longitudinal axis I-I. More precisely, the thread arc AF2 has a racial setback such that all the points of its peripheral lateral surface SLP are situated substantially at the same distance R' from the longitudinal axis I-I, with R' less than R.

Thus, during the insertion of the dental implant 1 by screwing into a hole made in the bone, the thread cuts into the bone, compresses the bone away from the longitudinal axis I-I, and leaves behind it a helical path into which then penetrates, due to the rotation of the dental implant 1, the thread arc AF2. On account of its radial setback, the peripheral lateral surface SLP of the thread arc AF2 will not rub against the bone that the peripheral lateral surface SLP of the thread arc API has previously shaped. The insertion torque of the dental implant 1 into the bone is thus reduced.

By contrast, the apical and coronal surfaces of the thread arc AF2 will rub against the bone that the apical and coronary surfaces of the thread arc AF1 have previously shaped and will therefore maintain good stability of the dental implant along the longitudinal axis I-I.

A similar construction with a radial setback RR is also provided in a part of the segment T3, the radial setback RP this rime being relative to the outer envelope 5, which is frustoconical.

For a good compromise between reduction of the insertion torque and stability of the dental implant along the longitudinal axis I-I, the radial setback RR of the thread arc AF2 is less than or equal to 30% of the maximum HSA height of the apical surface SA in the vicinity of the trailing end EF of the consecutive thread arc AF1, or less than or equal to 30% of the maximum HSA height of the apical surface SA in the vicinity of the leading end EA of the consecutive thread arc AF3.

To confer a radial setback RR on a thread arc AF, it is possible, for example, to rework said thread arc AF using a milling cutter which radially trims the thread arc AF.

In the embodiment illustrated in the figures, the threads F1 and F2 have an alternation of thread arcs AF having a radial setback RR and thread arcs AF that are without a radial setback RR. In other words, each thread arc AF having a radial setback RR is preceded and followed by thread arcs AF without a radial RR setback.

The dental implant 1 comprises a plurality of thread arcs AF having a radial setback RR, and it will be noted that the thread arcs AF having a radial setback are distributed in a balanced manner all around the longitudinal axis I-I. This promotes good coaxial alignment of the longitudinal axis I-I of the dental implant 1 with the drilling axis of the hole made in the bone.

In FIG. 5, it will be noted that the dental implant 1 comprises an apical segment TA which develops from the apical end 2b in the direction of the coronal end 2a and which is without thread arcs AF having a radial setback RR. Here, the apical segment TA includes the entirety of the segments T4 and T5 and also a part of the segment T3.

The present invention is not limited to the embodiments explicitly described but includes the diverse variants and generalizations thereof that fail within the scope of the attached claims.

The invention claimed is:

1. A dental implant comprising an implant body extending along a longitudinal axis (I-I) between a coronal end and an apical end, said implant body having a core, along which there extends a helical threading having at least one thread, said core being tapered in the direction of the apical end over at least one segment of the length of the dental implant, in which:

at least two tapping grooves are formed in the threading and interrupt said at least one thread, such that said at least one thread has a succession of consecutive thread arcs, wherein said consecutive thread arcs belong to a same thread and follow one another along a helix of said helical thread, a thread arc being separated from a thread arc consecutive to it by one of said at least two tapping grooves, each thread arc has an apical surface oriented towards the apical end of the dental implant and a coronal surface oriented towards the coronal end of the dental implant, each thread arc has a peripheral lateral surface connecting the apical surface and the coronal surface of said thread arc and developing from a leading end to a trailing end, wherein, in said at least one segment of the dental implant in which the core is tapered, in said succession of consecutive thread arcs, a plurality of thread arcs have a radial setback, such that the peripheral lateral surface of said thread arcs having a radial setback is at all points situated at a distance from the longitudinal axis (I-I) that is less than the maximum distance, from the longitudinal axis (I-I), of the peripheral lateral surface of the thread arcs which consecutively precede and follow a thread arc having a radial setback.

2. The dental implant according to claim 1, wherein said at least one thread has an alternation of thread arcs that each have a radial setback and thread arcs that are without a radial setback.

3. The dental implant according to claim 1, wherein:
the dental implant comprises a plurality of thread arcs having a radial setback,
the thread arcs having a radial setback are distributed in a balanced manner all around the longitudinal axis (I-I) so that thread arcs having a radial setback are alternated between thread arcs that are without a radial setback.

4. The dental implant according to claim 1, wherein said at least one thread arc has a radial setback such that all the points of its peripheral lateral surface are situated substantially at the same distance from the longitudinal axis (I-I).

5. The dental implant according to claim 1, wherein the radial setback of said at least one thread arc having a radial setback is less than or equal to 30% of the maximum height of the apical surface in the vicinity of the trailing end or leading end of a thread arc which is consecutive to said at least one thread arc having a radial setback, said maximum height of the apical surface being taken in a plane substantially perpendicular to the longitudinal axis and being measured from the core of the implant body.

6. The dental implant according to claim 1, wherein:
in a part of the threaded length of the dental implant, the dental implant has an apical segment, developing from the apical end in the direction of the coronal end,
the apical segment is without thread arcs having a radial setback.

7. The dental implant according to claim 1, wherein the threading comprises a plurality of threads.

8. The dental implant according to claim 1, wherein three tapping grooves are formed in the threading.

9. The dental implant according to claim 1, wherein said at least two tapping grooves extend over more than half of the threaded length of the dental implant.

10. The dental implant according to claim 1, wherein said at least two tapping grooves extend helically.

11. The dental implant according to claim 1, wherein the core is conically tapered.

12. The dental implant according to claim 1, wherein the threading is tapered.

13. The dental implant according to claim 1, wherein the threading is cylindrical.

14. The dental implant according to claim 7, wherein the threading comprises two threads.

15. The dental implant according to claim 12, wherein the threading is conically tapered.

16. The dental implant comprising an implant body extending along a longitudinal axis (I-I) between a coronal end and an apical end, said implant body having a core, along which there extends a helical threading having at least one thread, said core being tapered in the direction of the apical end over at least one segment of the length of the dental implant, in which:
at least two tapping grooves are formed in the threading and interrupt said at least one thread, such that said at least one thread has a succession of consecutive thread arcs, wherein said consecutive arcs belong to a same thread and follow one another along a helix of said helical thread, a thread arc being separated from a thread arc consecutive to it by one of said at least two tapping grooves,
each thread arc has an apical surface oriented towards the apical end of the dental implant and a coronal surface oriented towards the coronal end of the dental implant,
each thread arc has a peripheral lateral surface connecting the apical surface and the coronal surface of said thread arc and developing from a leading end to a trailing end,
wherein, the at least one segment of the dental implant in which the core is tapered comprises:
at least one thread arc having a radial setback, such that the peripheral lateral surface of said at least one thread arc having a radial setback is at all points situated at a distance from the longitudinal axis (I-I) that is less than the maximum distance, from the longitudinal axis (I-I), of the peripheral lateral surface of a thread arc which is consecutive to said at least one thread arc having a radial setback,
a plurality of thread arcs without radial setback having their respective peripheral lateral surfaces situated at a same and constant distance from the longitudinal axis (I-I).

17. The dental implant according to claim 16, wherein said at least one thread has an alternation of thread arcs that each have a radial setback and thread arcs that are without a radial setback.

18. The dental implant according to claim 16, wherein:
the dental implant comprises a plurality of thread arcs having a radial setback,
the thread arcs having a radial setback are distributed in a balanced manner all around the longitudinal axis (I-I) so that thread arcs having a radial setback are alternated between thread arcs that are without a radial setback.

19. The dental implant according to claim 16, wherein said at least one thread arc has a radial setback such that all the points of its peripheral lateral surface are situated substantially at the same distance from the longitudinal axis (I-I).

20. The dental implant according to claim 16, wherein the radial setback of said at least one thread arc having a radial setback is less than or equal to 30% of the maximum height of the apical surface in the vicinity of the trailing end or leading end of a thread arc which is consecutive to said at least one thread arc having a radial setback, said maximum height of the apical surface being taken in a plane substantially perpendicular to the longitudinal axis and being measured from the core of the implant body.

21. The dental implant according to claim 16, wherein:
in a part of the threaded length of the dental implant, the dental implant has an apical segment, developing from the apical end in the direction of the coronal end,
the apical segment is without thread arcs having a radial setback.

22. The dental implant according to claim 16, wherein the threading comprises a plurality of threads.

23. The dental implant according to claim 16, wherein three tapping grooves are formed in the threading.

24. The dental implant according to claim 16, wherein said at least two tapping grooves extend over more than half of the threaded length of the dental implant.

25. The dental implant according to claim 16, wherein said at least two tapping grooves extend helically.

26. The dental implant according to claim 16, wherein the core is conically tapered.

27. The dental implant according to claim 16, wherein the threading is tapered.

28. The dental implant according to claim 16, wherein the threading is cylindrical.

29. The dental implant according to claim 22, wherein the threading comprises two threads.

30. The dental implant according to claim 27, wherein the threading is conically tapered.

* * * * *